United States Patent [19]

Cole et al.

[11] Patent Number: 5,104,668

[45] Date of Patent: Apr. 14, 1992

[54] PROCESS FOR TREATING UNHATCHABLE ARTEMIA BRINE SHRIMP CYSTS

[75] Inventors: David Cole, Castro Valley; Andreas Schmidt, Alameda, both of Calif.

[73] Assignee: Salt Lake Brine Shrimp, Inc., Grantsville, Utah

[21] Appl. No.: 645,543

[22] Filed: Jan. 24, 1991

[51] Int. Cl.$^5$ .................. A23L 1/328; A23L 1/33
[52] U.S. Cl. ...................... 426/285; 426/453; 426/456; 426/471; 426/479; 426/643; 426/805
[58] Field of Search ............... 426/285, 643, 453, 456, 426/471, 478, 479, 495, 506, 519, 2, 805; 119/2

[56] References Cited

U.S. PATENT DOCUMENTS

| | | | |
|---|---|---|---|
| 3,039,101 | 6/1962 | Bradford | 426/453 X |
| 4,163,064 | 7/1979 | Hill | 426/2 |
| 4,996,780 | 3/1991 | Goe | 426/643 X |

Primary Examiner—Arthur L. Corbin
Attorney, Agent, or Firm—K. S. Cornaby

[57] ABSTRACT

A process for treating Artemia brine shrimp cysts, which are deemed unhatchable, by the following steps: rehydrating the cysts in clear water until they are approximately double their weight; mechanically rupturing the rehydrated cysts without destroying the internal embryo content of the cysts; centrifuging the resulting slurry to extract the content of the cysts from fragmented casings; and processing the slurry to stabilize the contained nutritional values thereof.

9 Claims, 1 Drawing Sheet

PROCESS FOR TREATING UNHATCHABLE ARTEMIA BRINE SHRIMP CYSTS

BACKGROUND OF THE INVENTION

This invention relates to the processing of brine shrimp eggs to recover nutritional values.

The brine shrimp (Artemia sp.) has been the subject of extensive academic studies over at least the past 50 years. An entire wealth of academic literature is available that describes both the nutritional composition and benefits of Artemia, and the use of Artemia as a tropical fish food and as a larval feed in aquaculture. Additional extensive material has been published covering the biometric and chemical composition and functional aspects of Artemia.

It is important to note that Artemia can either produce live young or deposit encapsulated embryos (commonly called brine shrimp eggs or cysts). The direction toward live bearing or egg laying is dependent upon a number of physiological and genetic conditions in the brine shrimp as well as the brine shrimp's habitat. When the brine shrimp does Produce cysts, many are genetically coded and replete with the necessary enzymes and chemicals to identify and assist in the hatching process. Then, when the environmental conditions meet the hatching criteria, or when such conditions are induced artificially through controlled rehydration, these brine shrimp cysts will hatch and produce brine shrimp nauplii.

Despite the wealth of literature and academic study, there is still no definitive answer that addresses all of the points with respect to breaking dormancy and quiescence for the encapsulated brine shrimp embryo and triggering the hatching process. As a partial consequence of this lack of full scientific knowledge, it is well known and supported by empirical data that many brine shrimp cysts will not hatch under any conditions. In the past the nutritional value of such brine shrimp has remained untapped because there was no reasonable use for unhatchable cysts.

While techniques are well known for decapsulating such cysts, i.e., removing, by chemical action, the hard outer shell that encases the embryo (see U.S. Pat. No. 4,163,064), such decapsulation is often not cost effective and has still not yielded a viable embryo that can be used as a stand alone food. The standard decapsulation process, through its use of oxidizing and neutralizing agents, is also impractical to practice on a large scale due to the potential pollution caused by the chemicals incorporated in the process and the environmental concerns that are raised for the disposal of such chemicals. In fact, even if practiced, such deshelled brine shrimp eggs still have all of the drawbacks of the original brine shrimp cysts; and for utilization as a live food, they must still be hatched and fed as living nauplii to target species.

Further, there are some substantial differences in the nutritional (biochemical) value and composition between: (a) the encapsulated brine shrimp cyst; (b) the newly hatched nauplii that result when the brine shrimp cysts' diapause/quiescence is broken and metabolism has begun; and, (c) a fully grown adult brine shrimp. In the past there has been no method for tapping into the differing nutritional value of the encapsulated cysts, short of going through the hatching process, which, as noted, changes the nutritional composition of the animal.

It has been recognized in the past few years that certain target species require additional nutritional elements that are deficient in natural brine shrimp. While products have been developed as a supplement to brine shrimp to make up for such known nutritional deficiencies, no product is yet available that combines these additional nutrients with the brine shrimp itself.

Finally, there is the constraint of feeding size that must be considered. Even a tiny, newly hatched brine shrimp nauplii (approximately 460 microns in length) is still too large to be taken as food by the young of target species for a period of anywhere from 4-7 days into their life cycle. As aquaculture has developed as a viable industry around the world, a number of alternatives to feeding live, newly hatched brine shrimp nauplii derived from hatching encapsulated cysts, has resulted in a variety of feeds used in the early life stages of target creatures. Such feeds have typically involved various algae or algae substitutes.

It is an objective of this invention to provide a bring shrimp product as a feed in a much smaller micron size, e.g nominally 5-50 microns, than normally available, thereby Providing the opportunity for an early regimen feeding for target species, which is composed solely or primarily of Artemia.

It is a further objective to rehydrate and rupture Artemia cysts which remain in a state of diapause or are otherwise non-hatchable.

It is an additional objective of the invention to create a hitherto unavailable nutritional and food balance than obtainable by hatching Artemia cysts.

It is also an objective of this invention to provide a mechanical process, devoid of chemical treatment, for extracting nutritional values from unhatchable cysts for which dormancy and quiescence cannot be artificially hatched or broken.

SUMMARY OF THE INVENTION

The objectives of invention are achieved by treating Artemia unhatchable cysts to the following steps: rehydrating the cysts in clear water until they are approximately double their weight, mechanically rupturing the rehydrated cysts without destroying the internal content of the cysts to produce a slurry; and centrifuging the slurry to extract the moisture content from the fragmented cyst casings. The resulting embryo slurry without the casings can then be processed either to stabilize the nutritional values contained therein, or to mechanically process the embryo slurry into a stabilized form.

THE DRAWING

A preferred embodiment of the invention is shown in the accompanying drawing, in which:

FIG. 1 is a flow chart showing the process for treating unhatchable brine shrimp eggs.

DESCRIPTION OF THE PREFERRED EMBODIMENT

Figure 1:
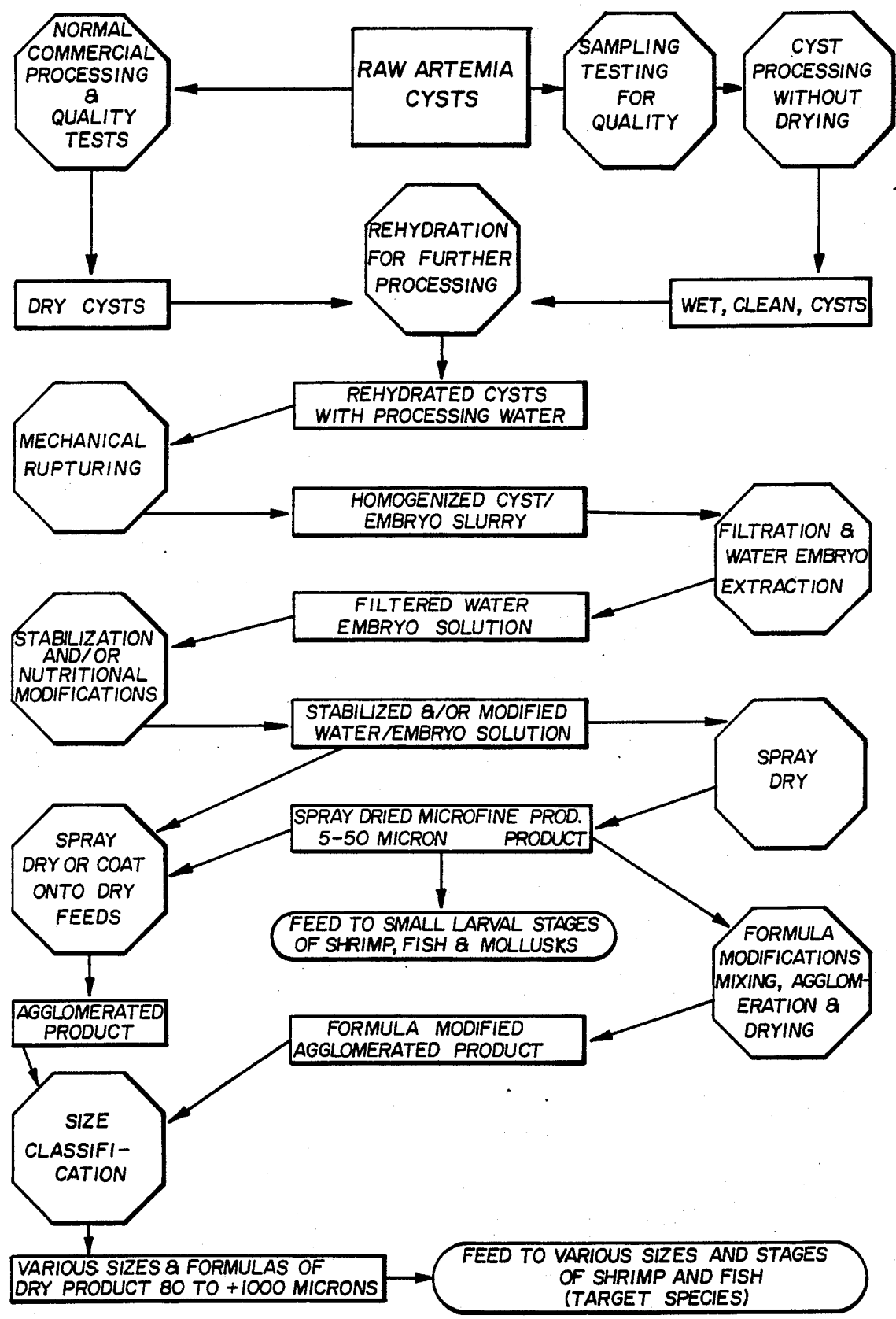

As shown in the attached drawing, in a preferred embodiment of the process, brine shrimp eggs are first rehydrated in clear water until they are approximately double their initial weight. There is a critical temperature dependent time element associated with both the moisture pick up of the cysts so as to achieve adequate hydration for the second step of the process while at the same time providing not too long a rehydration period, thus limiting biochemical reactions in the cyst. If left to rehydrate too long, some cysts will begin to hatch or, at a minimum, the biochemical process triggered by rehydration will cause the nutritional value of the cyst to change. Likewise, if there is too short a rehydration period, there will not be sufficient moisture gain to permit the correct processing in the next step.

As a second step, the appropriately rehydrated cysts must then be ruptured mechanically through the use of a press, mixer, homogenator, blender, or similar device. The energy output and/or tolerances of the rupturing device(s) is critical so as to ensure rupturing of a maximum number of cysts without, at the same time, destroying the internal content of the cysts or pulverizing the shell into particles less than retention size. In order to make this an energy-efficient process and to ensure appropriate sizing, the rehydration mentioned above is critical. Fully dehydrated cysts do not lend themselves to a mechanical rupturing which yields any product that can be extracted.

The slurry obtained from the rupturing process described above is then introduced into a filter bag, a fine mesh screen enclosure, or similar device, and centrifuged, so as to extract the moisture content, consisting of water and embryo mass, which has been freed from the ruptured cyst, while retaining the ruptured cysts' casing and any unruptured cysts within the filter bag or screen enclosure. The water/embryo mass material now in liquefied form is pumped into an appropriate holding vessel where alternate and/or additional steps can then take place.

Once the embryo slurry material is created, further processing steps or ingredient injection are possible to either (a) stabilize the nutritional value or, (b) mechanically process the slurry into a stabilized form.

The following ingredients can be combined with the slurried water/embryo mass to create a stabilized effect: Ascorbic Acid; Ethoxyquin; and Dry Vitamin E Acetate. A number of additional ingredients can also be added either at this stage or at the agglomeration stage discussed below. Ingredients such as various fish oils, other vitamins or minerals can be added to meet known specific nutritional requirements of target species.

Alternatively, or additionally, the slurry mass can be held in a refrigerated or frozen state to provide shelf stability. From this state it can then be spray dried into a fine micron size, hereinafter sometimes referred to as the acronym "EPAC", to accomplish the feeding of early larval stages noted above. This slurry can also be used in fluid bed agglomeration or sprayed on other feeds as an attractant.

Once spray dried, the produce has a size of 5-50 microns with a mean of 30 microns, which is an ideal size for early larval forms of many aquaculture species. Additionally, the dried product can be agglomerated using many different methods, including, but not limited to, agitation, balling or mixer agglomeration. Agglomeration can produce particles of larger size from 80 to well over 1,000 microns. These larger sizes can be separated to provide a range of feeding sizes ideal for various stages of larvae requirements. Additionally, agglomeration can be performed on a large scale using equipment such as counter-current mixer granulators, pelletizers, or fluid bed dryers.

Several tests were conducted using the process of the invention. The results of those tests are set forth below.

TEST RESULTS

EPAC Batch #1

The initial laboratory work was done with 500 grams of cysts from a prewashed and dried batch determined to be of inferior hatching quality. These cysts were hydrated for approximately one hour in excessive amounts of fresh water. After the hydration period, the cysts were removed from the hydration water, washed with fresh water and placed in a blender equipped with a special rotor-stator blade to homogenate the cysts. Sufficient water was added to the hydrated cysts in the blender so that the cysts/water solution would flow freely and homogenize inside of the blender.

The blender was run for approximately 3 minutes, then opened and felt by hand to determine if the cysts were being homogenized. Some homogenization had taken place and the blender was again run for 2 minutes. Then the solution was poured over a 105 micron "Standard Testing Sieve" which captured the non-homogenized cysts and the shells of the ruptured cysts, allowing the water and embryo homogenization to pass through the sieve into a container.

The water/embryo solution was pinkish/orange in color. A small sub-sample of the water/embryo solution was taken in a test tube and centrifuged in a clinical centrifuge for 15 minutes. After centrifugation the test tube was removed and observed. Upon observation it was discovered that four distinct layers or levels existed within the tube. On the bottom, in the pellet or precipitate region was a small layer of brown solids. Above that layer, an orange, pink colored layer of solids appeared. Above the described two layers of solids was a clear liquid supernatant fraction with a slight yellow color to it. Floating above the supernatant was a white layer, which appeared to be fats. The solid sections of the Precipitate appeared to be protein and ash in composition.

Based on the initial observations that the special homogenization process was successful in the extraction of the major nutritional components of the Artemia embryo encased in the cysts, it was decided to scale up the process in order to produce a sample size suitable for laboratory analysis of nutritional parameters.

EPAC Batch #2

Ten pounds of cysts, gathered from a cyst lot with inferior hatching quality or unhatchable, were divided into 2.5 pound portions. The portions were washed with fresh water in a standard egg washing net to remove any dust or other contaminates that may have been present. The cysts were removed from the net and placed in containers, into which 4 liters of fresh water were added and aeration was supplied to keep the cysts in suspension. This hydration period lasted 4 hours at 20° to 27° C. The overall totals were 35.3 lbs. of water to 10 lbs. of dry cysts.

After the hydration period, approximately ¼ of a gallon of the hydrated cysts still in solution were placed in a 3-speed commercial blender equipped with a rotor-stator blade assembly. The blender had free running speeds of up to 20,000 rpm. The blender was run for 2-4 minutes per ¼ gallon batch, during which time a simple finger test, gently squeezing the cysts between the fingers, was used to indicate if the individual batches were completely homogenized. After homogenization, these batches were poured into containers.

The homogenate in the containers was then poured into an egg washing net, which prevents particles greater than 150 to 230 microns from passing through it, a.k.a. filter bag within a modified domestic washing machine. The washing machine was modified so that it was capable of running only in the spin cycle, acting as a centrifuge or dewatering device. The filter bag was then tied off at the top and the machine started. The centrifugal force created by the spin cycle of the machine was great enough to force the liquid portion of the homogenate out of the bag, leaving behind shell and any cysts that were not ruptured in the blender. This liquid, containing the sought-after nutrients, was pumped through the washing machine into small storage drums.

The final yield was 24 pounds of extract comprising internal cyst product and water along with 20 pounds of wet shells and non-extracted matter. A moisture analysis from the laboratory measured the solids of the extract at 8.6%. Therefore the dry to dry extraction rate was 10:2.1.

A 2-liter sample was sent out for analysis from an independent testing laboratory that gave the following results:

|  | WET (grams/100) | DRY (%) |
| --- | --- | --- |
| Protein | 4.43 | 50.6 |
| Fat | 1.30 | 14.9 |
| Carbos | 2.61 | 29.8 |
| Fiber | N.D. | 0.0 |
| Ash | 0.41 | 4.7 |
| Moisture | 91.25 | 0.0 |
| Calories | 39.9 atwater/100 grams | |

The solid content was 8.75%, slightly higher than our laboratory analysis. It is possible to spray dry materials in this moisture range. Most frozen fish diets range from 80 to 90% moisture.

Gelatin base cubes were prepared and fed to fresh water tropical fish, and acceptance was excellent.

The laboratory analysis supported our initial hypothesis that the special homogenization process extracted the valuable, nutritious mass of the Artemia embryo. The data also appear to show that the process extracts the internal mass of the cysts without favoring proteins over fats or leaving behind other beneficial nutrients. Furthermore, the acceptance of the feed was found to be more than adequate for fish, which allows it to be used in feed formulation.

EPAC Batch #5

Equipment and set up:

A 10,000 liter, open top, parabolic tank was used as a hydration tank. This tank was fitted with an air line on the bottom to keep the cysts in suspension via aeration, after the addition of water. The tank was fitted with a fresh water supply line and a flow meter to facilitate the addition of known amounts of fresh water. The tank also was equipped with two drains, one of which was plumbed to a 2" pneumatic diaphragm pump, the other drain was plumbed to waste.

The 2" diaphragm pump forced the hydrated cyst solution into a multi-frequency mixer, which is a larger rotor-stator type mixer, via ¾" PVC pipe. The mixer could and did homogenize a constant flow of the cyst solution which flowed through the mixer into a collection tank. Many tests were run varying such parameters as flow rate, speed of mixer, and line pressures. The optimum extraction rate found for the large tolerance rotor-stator mixer was in the range of 55 to 65 GPH with line pressures near 40 to 45 psi with maximum energy input from the mixer and a temperature of 36° C. to 38° C. at the outlet of the mixer.

The collection tank held and then distributed the homogenized solution into two different modified washing machines as described in earlier tests with filter bags inside for the separation of the nutritional liquid from the shells/non-homogenized cysts. The liquid was pumped using the pumps in the washing machines into 55 gallon plastic drums.

The PVC pipe system was equipped with appropriate pressure gauges, control valves and in-line thermometers to assist in optimization of the mixer operation.

Alternative equipment used in the process included the following:

Mixer/Homogenizer:

At present time, investigations are underway to explore the possibility of using mixers with closer tolerances in the rotor-stator to improve the rupture percentage when the cysts/water solution passes through the mixer. This would improve overall efficiency, hopefully near 80%. Another option to increase the overall efficiency is to run the shells and non-homogenated cysts into the mixer another time with added water. Another alternative is to use a press to extract the water embryo solution after rehydration of cysts. The rehydrated cysts placed in an appropriate mesh bag could then be introduced into the press and, with the appropriate amount of pressure applied, an efficient recovery might occur.

Dewatering/Centrifugal and filtering devices:

The use of commercial dewatering devices with a removable stainless steel 100 micron filter mesh inside the chamber will improve product quality and lower labor costs. Different size filter mesh could also be examined.

Product Cooling Equipment:

A unit such as a heat exchanger or other such device could be used to reduce the temperature of the embryo/water as it leaves the dewatering equipment. This will again improve final product quality by limiting bacterial growth and Product oxidation.

Spray Drying

When larger batches of the embryo/water liquid are available, it could first be condensed using plate and frame evaporative condensers. This will condense the liquid to about 40 percent solids. This procedure will cut spray drying cost nearly in half and may help to decrease the particle size of the final dry product, making it acceptable for a wider range of smaller larvae fed at aquaculture projects.

Other Possible Additives:

Fish, egg, and/or algae concentrate and/or fish oils high in highly unsaturated fatty acids could be added prior to the spray drying process to meet different nutritional needs of different larvae (e.g. cod liver oil, sole oil and/or halibut oil).

Agglomeration of EPAC:

The dry product, EPAC, can be agglomerated using many different methods including, but not limited to agitation, balling or mixer agglomeration. Agglomeration can produce particles of larger size from 80 to well over 1000 microns. Particles of greater size are more readily accepted by larger larvae or post larval animals. Some stages of larvae require particles much larger than 50 microns to feed effectively, and with agglomeration and sizing many different classes of sizes can be produced to maximize feed usage. Large scale agglomeration equipment used may consist of countercurrent mixer-granulator, pelletizer or a pin mixer.

A batch of agglomerated EPAC (6.6 pounds wet weight) was produced using a food processor in the laboratory. The formulation followed was 132 grams of dry EPAC, 6.5 grams Nurapan Full Fat Soy (microfine), 6.5 grams of activated wheat gluten, 1.3 grams sodium chloride and 40 grams of water. The addition of these dry products aids in agglomeration and water stability, and have nutritional value as well. The dry ingredients are mixed and the water is added as the food processor is running, producing small "balls of product." Several batches were produced, mixed and then freeze dried to a moisture content of less than 2 percent. 5.25 pounds of dry agglomerated EPAC were produced after freeze drying.

The dry agglomerated product was then mixed to break up large agglomerations of product and screened/classified to four size groups: <250 microns, >250<500 microns, >500<710 microns, and >710 microns. The largest particles were then pulverized to yield more of the smaller sized particles after rescreening.

Other Possible Additives For Agglomerated EPAC:

Many dry products can be added to the formula. Some of the more beneficial products would be: spray dried fish meal, fish oils, vitamins, minerals, and preservatives. Sodium chloride can be eliminated or reduced for fresh water larvae. The addition of fish meal is of particular interest because of its wide use in grow-out diets. EPAC can aid in the weaning of larvae from Artemia type feeds to fish meal and other diets that seem to be less attractive to the post larvae or fingerlings. This can be done by slowly decreasing the percentage of EPAC in a feed over the life time of the culture organism.

We claim:

1. A process for removing embryonic Artemia brine shrimp eggs from their cyst casings, comprising the steps of:
    (a) rehydrating unhatchable Artemia brine shrimp cysts in non-saline water for a period of time sufficient to approximately double the weight of the cysts;
    (b) mechanically rupturing the rehydrated cysts without damaging the internal egg content of the cysts to produce an aqueous slurry of cyst contents and cyst casing fragments; and
    (c) separating the slurry of cyst contents from the cyst casing fragments to produce a substantially fragment-free slurry of cyst content nutritional values.

2. A process as set forth in claim 1, wherein said mechanical rupturing of the cysts includes rotor-stator agitation of an aqueous mass of Artemia cysts.

3. A process as set forth in claim 1, wherein said separating of the slurry of cyst contents and cyst casing fragments includes centrifugation of the slurry.

4. A process as set forth in claim 1, wherein said slurry of cyst contents and cyst casing fragments includes unruptured cysts which are treated as cyst casing fragments.

5. A process as set forth in claim 1, wherein the fragment-free cyst content slurry is further treated by drying the slurry to remove substantially all water from the cyst content slurry and thereby produce a dried cyst content nutritional value product.

6. A process as set forth in claim 5, wherein the drying is a spray-drying process.

7. A process as set forth in claim 5, wherein the dried cyst content product is mixed with food additives selected from the group consisting of dried fish meal, fish oil, vitamins, minerals and preservatives.

8. A process as set forth in claim 5, wherein the dried cyst content product is agglomerated to produce varying sizes of usable food particles.

9. A process as set forth in claim 8, wherein food additives are mixed with the dried cyst content product during agglomeration thereof.

* * * * *